US007754055B2

(12) United States Patent
Harmon et al.

(10) Patent No.: US 7,754,055 B2
(45) Date of Patent: *Jul. 13, 2010

(54) POLYMER/CARBON NANOTUBE COMPOSITES, METHODS OF USE AND METHODS OF SYNTHESIS THEREOF

(75) Inventors: Julie P. Harmon, Tampa, FL (US); LaNetra M. Clayton, Plant City, FL (US)

(73) Assignee: University of South Florida, Tampa, FL (US)

( * ) Notice: Subject to any disclaimer, the term of this patent is extended or adjusted under 35 U.S.C. 154(b) by 666 days.

This patent is subject to a terminal disclaimer.

(21) Appl. No.: 11/607,772

(22) Filed: Dec. 1, 2006

(65) Prior Publication Data
US 2008/0306184 A1    Dec. 11, 2008

Related U.S. Application Data

(63) Continuation-in-part of application No. 11/117,592, filed on Apr. 28, 2005, now Pat. No. 7,399,794.

(60) Provisional application No. 60/741,319, filed on Dec. 1, 2005, provisional application No. 60/565,917, filed on Apr. 28, 2004.

(51) Int. Cl.
B01J 19/10       (2006.01)
B01J 19/00       (2006.01)
C08J 3/28        (2006.01)
C08F 2/42        (2006.01)

(52) U.S. Cl. ............... 204/157.62; 204/157.15; 522/157; 522/158; 522/161; 522/70; 524/495; 524/496; 264/405; 264/442; 264/448

(58) Field of Classification Search ............ 522/157, 522/158, 161, 70; 204/157.15; 524/495, 524/496; 264/405, 442, 488
See application file for complete search history.

(56) References Cited

U.S. PATENT DOCUMENTS

| 6,057,637 | A   | 5/2000 | Zettl et al. | |
| 6,599,961 | B1  | 7/2003 | Pienkowski et al. | |
| 7,399,794 | B2* | 7/2008 | Harmon et al. | 204/157.15 |
| 2003/0158323 | A1 | 8/2003 | Connell et al. | |
| 2006/0054488 | A1 | 3/2006 | Harmon et al. | |

FOREIGN PATENT DOCUMENTS

| JP | 2001011344 | 1/2001 |
| WO | WO 03/080513 | 2/2003 |

OTHER PUBLICATIONS

Abdo A. E. et al. "Natural Fibre High-Density Polyethylene and Lead Oxide Composites for Radiation Shielding", *Rad. Phys. and Chem.*, 2003, pp. 185-195, vol. 66.

Andrews, R. et al. "Nanotube Composite Carbon Fibers", *Applied Physics Letters*, 1999, pp. 1329-1331, vol. 75.
Beuneu, F. et al. "Modification of Multiwall Carbon Nanotubes by Election Irradiation: An ESR Study", *Physical Review B*, Feb. 15, 1999, pp. 5945-5948, vol. 59.
Bhattacharyya, A. R. et al. "Crystallization and Orientation Studies in Polypropylene/Single Wall Carbon Nanotube Composite", *Polymer*, 2003, pp. 2373-2377, vol. 44.
Biagtan E. et al. "Polymer Scintillators: Continuous Versus Intermittent Gamma Irradiation Effects", *Optical Polymers Fibers and Waveguides*, 2001, pp. 221-230, ACS Symposium Series 795, American Chemical Society, Washington, DC.
Bower, C. et al. "Deformation of Carbon Nanotubes in Nanotube-Polymer Composites" *Applied Physics Letters*, May 31, 1999, pp. 3317-3319, vol. 74, No. 22.
Cadek, M. et al. "Reinforcement of Polymers with Carbon Nanotubes: The Role of Nanotube Surface Area", *Nano Letters*, 2004, pp. 353-356, vol. 4.
Choy et al. "Mechanical Relaxations in Polybutene-1 and Poly-4-Methylpentene-1", *Polymer*, 1981, pp. 534-548, vol. 22.
Clayton, L. M. et al. "Processing of Transparent Polymer Nanotube Composites Via Heat, UV Radiation and Ionizing (gamma) Radiation Using Ultrasonication and Solvent Dissolution" *Materials Research Society Symposia Proceedings*, 2003, pp. M2.4.1-M2.4.9, vol. 772.
Clayton, L. M. et al. "Transparent Poly(methyl methacrylate)/Single-walled Carbon Nanotube (PMMA/SWNT) Composite Films with Increased Dielectric Constants" *Advanced Functional Materials*, 2005, pp. 101-106, vol. 15.
Clayton, L. M. et al. "Gamma Radiation Effects on the Glass Transition Temperature and Mechanical Properties of PMMA/soot Nanocomposites", *Polymer Bulletin*, 2004, pp. 259-266, vol. 52.
Clough, R. et al. "Radiation Resistance of Polymers and Composites" in *Irradiation Effects on Polymers*, Eds. D. W. Clegg and A. A. Collyer, Elsevier Applied Science, New York, 1991, pp. 79-156.
Cucinotta, F. A. et al. "Space Radiation Cancer Risks and Uncertainties for Mars Missions", *Rad. Res.*, 2001, pp. 682-688, vol. 156.
Emran, S. K. "Viscoelastic Properties and Phase Behavior of 12-tert-Butyl Ester Dendrimer/Poly(methyl methacrylate) Blends", *J. Polymer Science: Part B: Polymer Physics*, 2001, pp. 1381-1393, vol. 39.
Gao, H., et al. "Para—Substituted Polystyrenes: Stress Relaxation, Creep, Dynamic Mechanical and Dielectric Analysis", *Thermochimica Acta*, 1996, pp. 85-102, vol. 284.

(Continued)

*Primary Examiner*—Sanza L McClendon
(74) *Attorney, Agent, or Firm*—Saliwanchik, Lloyd & Saliwanchik

(57) ABSTRACT

Polymer/carbon nanotube composites including single-wall or multi-wall carbon nanotubes incorporated into the matrix of a polymer are provided. These composites can be used in environments exposed to galactic cosmic radiation. Accordingly, the composites are useful in deep space applications like space vehicles, space stations, personal equipment as well as applications in the biomedical arts and atom splitting research. The composites can be modified with organic dyes containing at least one phenyl ring and the resulting doped composite is useful as a radiation detector. The preferred polymer is poly(4-methyl-1-pentene). At low nanotube concentrations (i.e., about 0.5 wt % or less), the composites exhibit transparent optical qualities. At higher nanotube concentrations (i.e., about 0.6 wt % or more), the composites are non-transparent.

12 Claims, 16 Drawing Sheets

OTHER PUBLICATIONS

Grimes, C. A. et al. "The 500 MHz to 5.50 GHz Complex Permittivity Spectra of Single-Wall Carbon Nanotube-Loaded Polymer Composites" *Chemical Physics Letters*, Mar. 24, 2000, pp. 460-464, vol. 319.

Goodhead, D. T. "ESR Study of Radiation Damage in TPX Polymer (Poly-4- Methylpentene-1 1)", *J. Polym. Sci.*, Part A-2, 1971, pp. 999-1024, vol. 9.

Hamon, M. A. et al. "Dissolution of Single-Walled Carbon Nanotubes" *Advanced Materials*, 1999, pp. 834-840, vol. 11.

Haggenmueller, R. et al. "Aligned Single-Wall Carbon Nanotubes in Composites by Melt Processing Methods", *Chemical Physics Letters*, 2000, pp. 219-225, vol. 330.

Harmon, J. P. et al. "Ionizing Radiation Effects on Interfaces in Carbon Nanotube-Polymer Composites", *Materials Research Society Symposium Proceedings Fall*, 2002, pp. P9.7.1-P9.7.11, vol. 697.

Higgenbotham-Bertolucci, P. R. et al. "Creep and Stress Relaxation in Methacrylate Polymers: Two Mechanisms of Relaxation Behavior Across the Glass Transistion Region" *Polymer Engineering and Science*, May 2001, pp. 873-880, vol. 41.

Hill, D. E. et al. "Functionalization of Carbon Nanotubes with Polystyrene", *Macromolecules*, 2002, pp. 9466-9471, vol. 35.

Hwang, G. L. et al. "Breakage, Fusion, and Healing of Carbon Nanotubes" *Nano Letters*, Jul. 18, 2001, pp. 435-438, vol. 1.

Jia, Z. et al. "Study on Poly(methyl methacrylate)/Carbon Nanotube Composites" *Materials Science & Engineering*, 1999, pp. 395-400, vol. A271.

Jin, C.-W. et al. "Interaction of Fullerenes and Carbon Nanotubes With Diatomic Molecules", *Synthetic Metals*, 2001, pp. 1221-1222, vol. 121.

Jin, L. et al. "Alignment of Carbon Nanotubes in a Polymer Matrix by Mechanical Stretching" *Applied Physics Letters*, Aug. 31, 1998, pp. 1197-1199, vol. 73.

Jin, Z. et al. "Nonlinear Optical Properties of Some Polymer/Multiwalled Carbon Nanotube Composites" *Chemical Physics Letters*, 2000, pp. 505-510, vol. 318.

Kim, M. Y. et al. "Performance of Polymeric Materials and Shielding for Cosmic Radiation" in *Irradiation of Polymers Fundamentals and Technological Applications*, Eds. R. L. Clough and S.W. Shalaby, ACS Symposium Series, 620 (1996) 350-362.

Koshio, A. et al. "A Simple Way to Chemically React Single-Wall Carbon Nanotubes with Organic Materials Using Ultrasonication" *Nano Letters*, 2001, pp. 361-363, vol. 1.

Krasheninnikov, A. V. et al. "Formation of Ion-Irradiation-Induced Atomic-Scale Defects on Walls of Carbon Nanotubes" *Physical Review B*, 2001, pp. 245405-1 to 245405-6, vol. 63.

Lai, J. Y. et al. "Preparation of Vinylpyridine Irradiation-Grafted Poly(4-Methyl-Pentene-1) Membrane for Oxygen Enrichment", *Journal of Applied Polymer Science*, 1986, pp. 5763-5775, vol. 32.

Lillehei, P. T. et al. "Imaging Carbon Nanotubes in High Performance Polymer Composites via Magnetic Force Microscopy", *Nano Letters*, 2002, pp. 827-829, vol. 2.

McCarthy, B. et al. "Observation of Site Selective Binding in a Polymer Nanotube Composite" *Journal of Materials Science Letters*, 2000, pp. 2239-2241, vol. 19.

Miyoshi et al. "Slow Chain Dynamics in *Isotactic*-poly(4-methyl-1-pentene) Crystallites Near the Glass Transition Temperature Characterized by Solid-State $^{13}C$ MAS Exchange NMR" *Macromolecules*, 2004, pp. 6460-6471, vol. 37.

Niyogi, S. et al. "Chromatographic Purification of Soluble Single-Walled Carbon Nanotubes (s-SWNTs)" *J. Am. Chem. Soc.*, Jan. 9, 2001, pp. 733-734, vol. 123.

Odegard, G. M. et al. "Constitutive Modeling of Nanotube-Reinforced Polymer Composites", *NASA/TM*, 2001-211044, pp. 1-13.

Ounaies et al. "Electrical Properties of Single Wall Carbon Nanotube Reinforced Polyimide Composites", *Composites Science and Technologies*, 2003, pp. 1637-1647, vol. 63.

Park, C. et al. "Dispersion of Single Wall Carbon Nanotubes by In Situ Polymerization Under Sonication" *Chem. Phys. Letters*, 2002, pp. 303-308, vol. 364.

Park, H. et al. "Sonochemical Synthesis and Catalytic Properties of Oxide and Carbide Nanocomposites on Carbon Nanotubes", *Chemistry Letters*, 2005, 222-224, vol. 34.

Penn, R. W. et al. "Frequency and Temperature Dependence of the Dynamic Mechanical Properties of Poly-4-Methylpentene-1", *Journal of Polymer Science: Part A-2*, 1966, pp. 559-569, vol. 4.

Platzer, N. A. J. "Preface" to *Irradiation of Polymers, Advances in Chemistry*, ACS Symposium Series, Gould, R. Ed. 1967, pp. vii-xii, vol. 66.

Qian, D. et al. "Load Transfer and Deformation Mechanisms in Carbon Nanotube- Polystyrene Composites", *Applied Physics Letters*, 2000, p. 2868-2770, vol. 76.

Reddy, S. et al. "Structure and Temperature-Dependent Properties of Poly(4-methyl-1-pentene) Fibers", *Macromolecules*, 1997, pp. 3293-3301, vol. 30.

Ruan, S. L. et al. "Toughening High Performance Ultrahigh Molecular Weight Polyethylene Using Multiwalled Carbon Nanotubes", *Polymer*, 2003, pp. 5643-5654, vol. 44.

Ryan, K. P. et al. "Carbon-Nanotubes Nucleated Crystallinity in a conjugated Polymer Based Composite", *Chemical Physics Letters*, 2004, pp. 329-333, vol. 391.

Sandler, J. et al. "Development of a Dispersion Process for Carbon Nanotubes in an Epoxy Matrix and the Resulting Electrical Properties", *Polymer*, 1999, pp. 5967-5571, vol. 40.

Schadler, L. S. et al. "Load Transfer in Carbon Nanotube Epoxy Composites" *Applied Physics Letters*, Dec. 28, 1998, pp. 3842-3844, vol. 73.

Shaffer, M. S. P. et al. "Fabrication and Characterization of Carbon Nanotube/Poly(vinyl alcohol) Composites", *Materials*, 1999, pp. 395-399, vol. 271.

Siochi et al. "Design and Characterization of Carbon Nanotube Composites", *Advanced Materials and Processing Branch, NASA*, 2003, Langley Research Center, Hampton, VA.

Smith, B. et al. "Knock-on Damage in Single Wall Carbon Nanotubes by Electron Irradiation", *Electronic Properties of Novel Materials-Science and Technology of Molecular Nanostructures*, 1999, pp. 360-363.

Star, A. et al. "Dispersion and Solubilization of Single-Walled Carbon Nanotubes with a Hyperbranched Polymer", *Macromolecules*, 2002, pp. 7516-7520, vol. 35.

Starkweather, H. W. et al. "Conductivity and the Electric Modulus in Polymers", *Journal of Polymer Science: Part B: Polymer Physics*, 1981, pp. 637-641, vol. 30.

Stephan, C. et al. "Characterization of Singlewalled Carbon Nanotubes-PMMA Composites" *Synthetic Metals*, 2000, pp. 139-149, vol. 108.

Tait, P.J.T. et al. "Polymerization of 4-Methylpentene-1 with Magnesium-Chloride-Supported Catalysts", *Advances in Polyolefins*, pp. 309-321, (R.B. Seymour and T. Cheng, eds. Plenum Press) (1987).

Tang, B. Z. et al. "Preparation, Alignment, and Optical Properties of Soluble Poly(phenylacetylene)-Wrapped Carbon Nanotube", *Macromolecules*, 1999, pp. 2569-2576, vol. 31.

Tatro, S. R. et al. "Probing Multi-walled Nanotube/Poly(methyl methacrylate) Composites with Ionizing Radiation", *Polymer*, 2004, pp. 1971-1979, vol. 45.

Wilson, J. W. et al. "Galactic and Solar Cosmic Ray Shielding in Deep Space", *NASA Technical Paper* 3682, Dec. 1997.

Woodard, A. E. et al. "Dynamic Mechanical Behavior of Some Partially Crystalline Poly-α-olefins", *Journal of Polymer Science*, 1961, pp. 117-125, vol. L.

Zeitlin, C. et al. "The Fragmentation of 510 MeV/Nuclear Iron-56 in Polyethylene. II. Comparisons Between Data and a Model" *Radiation Research*, 1996, pp. 666-672, vol. 145.

Clough, R. et al. "High-Energy Radiation and Polymers: A Review of Commercial Processes and Emerging Applications" *Nuclear Instruments and Methods Phys. Res B*, 2001, pp. 8-33, vol. 185.

Salvetat, J.-P. et al. "Elastic and Shear Moduli of Single-Walled Carbon Nanotube Ropes", *Physic. Rev. Letters*, 1999, pp. 944-.

\* cited by examiner

PMP/SWNT composite film    Pure PMP film

US 7,754,055 B2

POLYMER/CARBON NANOTUBE COMPOSITES, METHODS OF USE AND METHODS OF SYNTHESIS THEREOF

CROSS REFERENCE TO RELATED APPLICATION(S)

This application claims the benefit of U.S. Provisional Application Ser. No. 60/741,319, filed Dec. 1, 2005. In addition, this application is a continuation-in-part of U.S. patent application Ser. No. 11/117,592, filed Apr. 28, 2005 now U.S. Pat. No. 7,399,794; which claims the benefit of U.S. Provisional Application Ser. No. 60/565,917, filed Apr. 28, 2004, the disclosures of which are incorporated herein by reference in their entireties.

FIELD OF THE INVENTION

The subject invention relates to the field of polymer nanocomposites.

BACKGROUND OF THE INVENTION

In the development of solutions for reducing the radiation risks associated with manned space flight, radiation shielding materials have been developed to protect personnel and equipment from the damaging effects of radiation, including galactic cosmic radiation (GCR). Polyethylene (PE) is a favorable material because it exhibits many high performance properties (i.e., strength, thermal, and optical). However, the use of PE is limited to low temperature applications and to those applications wherein visibility through the polymer is not required because PE is an opaque polymer.

The incorporation of carbon nanotubes (CNTs) into polymer matrices has resulted in composites that exhibit increased thermal stability, modulus, strength, electrical and optical properties (Shaffer et al. 1999; Jin et al. 2001; Haggenmueller et al. 2000; Jia et al. 1999; Ounaies et al. 2003, Park et al. 2005, Tatro et al. 2004; Siochi et al. 2003; Clayton et al. 2005). Several investigations have concluded that carbon nanotubes can also act as a nucleating agents for polymer crystallization (Ryan et al. 2004; Cadek et al. 2004, Ruan et al. 2003).

Various processing techniques have been employed to uniformly disperse the nanotubes in an attempt to increase interaction at the polymer/nanotube interface (Shaffer et al. 1999; Jin et al. 2001; Haggenmueller et al. 2000; Ounaies et al. 2003, Park et al. 2005, Tatro et al. 2004; Siochi et al. 2003; Clayton et al. 2005).

SUMMARY OF THE INVENTION

Embodiments of the subject invention provide polymer nanocomposites with radiation resistant qualities wherein a plurality of carbon nanotubes are dispersed in a polymer matrix. Another aspect of the subject invention provides methods of fabrication of radiation resistant polymer nanocomposites. Other aspects of the subject invention provide methods of using the polymer composites as a deep space shielding material, and the subject methods also encompass using the polymer composite in various radiation prone environments on Earth and in space, including service on other planets or moons.

Advantageously, the type of carbon nanotube, the percentage of carbon nanotubes dispersed in the polymer matrix, and the optical qualities of the polymer affect the optical qualities of the resulting nanocomposite. Transparent nanocomposites can be prepared by dispersing a plurality of single-wall CNTs or multi-wall CNTs in a transparent polymer. Exemplary transparent polymers include, without limitation, poly(4-methyl-1-pentene) (PMP), polyvinylchloride (PVC), glycol-modified polyethylene terephthalate (PETG), polystyrene (PS), acrylonitrile-butadiene-styrene co-polymer (ABS), polyphenylene ether (PPE), polycarbonate (PC), polysulfone (PSU), polyethersulfone (PES), polyetherimide (PEI), polyphenylsulfone (PPSU), polyethylene terephthalate (PET), and polybuylene terephthalate (PBT). A preferred transparent polymer utilized in the subject nanocomposites is poly(4-methyl-1-pentene) (PMP).

Non-transparent polymers prepared from a plurality of CNTs dispersed in a transparent polymer can contain a sufficient weight percentage of CNTs to render the resulting composite non-transparent while maintaining the advantageous GCR resistant properties. In one embodiment, the sufficient CNT percentage generally varies from about 0.6 wt % to about 20 wt %. At percentages below about 0.6 wt %, the composites are typically transparent.

Advantageously, the nanocomposites, transparent or non-transparent, of the subject invention can also be prepared using single-wall or multi-wall CNTs. The polymer is preferably the isotactic form of poly(4-methyl-1-pentene). The polymer can be further doped with organic dyes containing at least one phenyl ring.

Another aspect of the subject invention pertains to methods for resisting GCR. These methods encompass providing at least one device comprising nanocomposites in accordance with the subject nanocomposites, at least on its surface, and exposing the device to GCR, whereby the device exhibits improved resistance to GCR compared to a device comprising only the polymer and excluding the carbon nanotubes. In one embodiment, the surface of the device is coated with the subject nanocomposites. In another embodiment, the device is molded from subject nanocomposites. The device can take the form of many different useful devices, for example and without limitation, spacecrafts, space suits, tools used in space environments, space stations, and other structures exposed to GCR when in use. Optionally, the device is coated with a tungsten spray coating.

Yet another aspect of the subject invention is directed to methods for preparing the nanocomposites. Embodiments of methods of preparation can encompass dissolving a polymer in a solvent while maintaining the temperature of the solvent at a level high enough to prevent precipitation of the polymer out of the solvent; sonicating a plurality of carbon nanotubes in a solvent; mixing the dissolved polymer and the sonicated CNTs; and sonicating the mixture for a sufficient period of time to disperse the CNTs throughout the polymer to produce a subject nanocomposite in solvent. The composite is optionally further processed by spin coating the nanocomposite and solvent onto a substrate. The spin coating step evaporates the solvent so that the nanocomposite is deposited as a coating on the substrate. The solvent can also be removed by heating the nanocomposite under a vacuum, thereby removing the solvent. The nanocomposite can then be molded into a device or structure. Optionally, the solvents used to dissolve the polymer and to sonicate the CNTs are the same. Preferably, the solvent is cyclohexyl chloride.

DETAILED DESCRIPTION OF THE INVENTION

Figure 1:
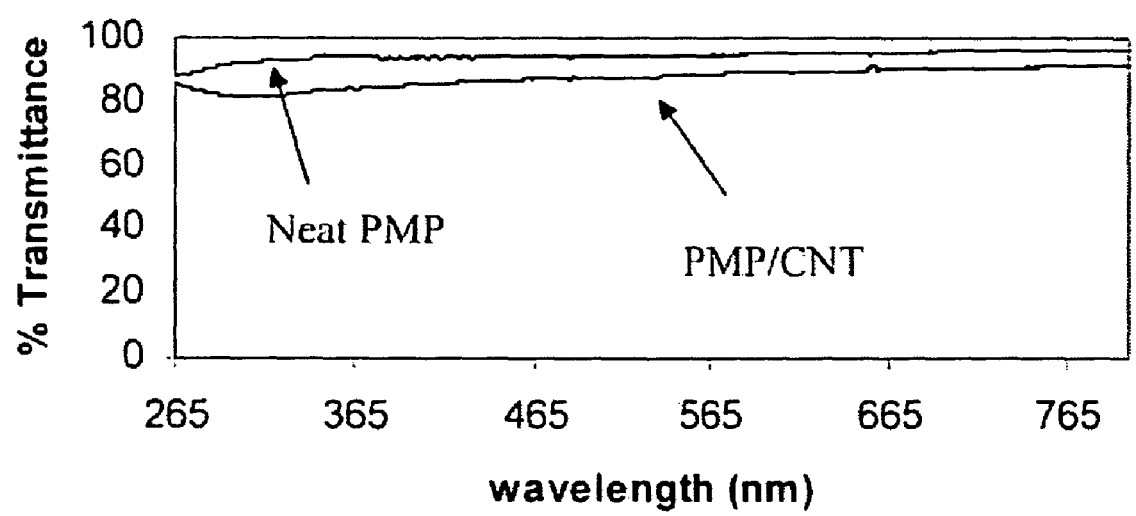
FIG. 1 shows the UV-VIS data of the neat 4-methyl-1-pentene (PMP) and a transparent PMP/CNT composite.

In the following detailed description of various embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

One aspect of the subject invention is directed to a unique polymer nanocomposite technology. Polymers exhibiting high potential for shielding galactic cosmic radiation (GCR) can be processed into composites while enabling a high level of processability for integrating the composites into apparatus exposed to GCR ionizing radiation when in use. Thus, the composites can be processed into, for example and without limitation, spacecraft, manned space vehicles, spacesuits, and manned planetary terrestrial living quarters.

The composites of the subject invention comprise carbon nanotubes that are incorporated into the matrix of a polymer. Advantageously, the carbon nanotubes can be single-wall, multi-wall, or a combination of both. Preferably, the carbon nanotubes are single-wall carbon nanotubes. Advantageously, carbon nanotubes are 100 times stronger than steel, exhibit excellent electrical and mechanical strength, and are light in weight. Due to their weight, CNTs are thought to be ideal fillers in a polymer matrix in order to produce a composite with GCR resistant properties, as well as with enhanced electrical and mechanical properties. Lighter weight materials exhibit superior GCR resistance while limiting secondary radiation.

In certain embodiments, the nanotube concentration (or weight percentage) in the polymer is between about 0.1 wt % and about 20 wt %. More preferably, the nanotube concentration is between about 0.1 wt % and about 5 wt %. Most preferably, the nanotube concentration is about 0.5 wt %. The nanotube concentration can be adjusted by mixing heat melted polymer with the polymer/CNT composite in a mixer. The concentration of nanotubes in the polymer affects the optical properties of the polymer. At low concentrations, the composites exhibit transparency while maintaining resistance to GCR. The nanotube concentration in the transparent composites is within the range of about 0.1 wt % to about 0.5 wt %. For example, and without limitation, the transparent composites of the subject invention can comprise about 0.1 wt % CNT, about 0.2 wt % CNT, about 0.3 wt % CNT, about 0.4 wt % CNT, or about 0.5 wt % CNT.

At higher CNT concentrations, the composites of the subject invention exhibit non-transparent optical qualities while maintaining resistance to GCR. At concentrations at and above about 0.6 wt %, the composites are non-transparent and appear black in color. Advantageously, these composites can be useful in space applications where visibility through the composite is not critical. In some specific embodiments, nanotube concentration of non-transparent composites fall within the range of about 0.6 wt % to about 20 wt %. In other embodiments, the CNT weight percentage is from about 0.6 wt % to about 15 wt %, from about 0.6 wt % to about 10 wt %, or from about 0.6 wt % to about 5 wt %.

Figure 2:
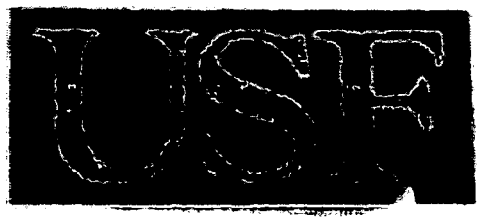
FIG. 2 depicts optical photographs of transparent PMP/CNT films.
Figure 2:
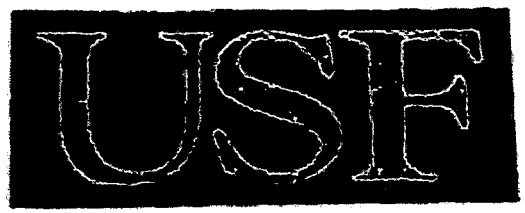

In one embodiment, the polymer utilized in the subject nanocomposites comprises a plurality of repeating hydrocarbon units that exhibits solubility in organic solvents. Preferably, the solvents are cyclohexane, cyclohexyl chloride, and cyclohexene. More preferably, the solvent is cyclohexyl chloride. The melting point temperatures of the polymers are preferably between about 200° C. and about 400° C. Preferably, the temperature range is from about 225° C. to about 275° C. Also, to obtain transparent composites, the polymer should be transparent in the visible region of the Electromagnetic Spectrum. FIG. 2 illustrates the transparency of one embodiment of the transparent polymer/SWNT composite.

Suitable polymers include, without limitation, poly(4-methyl-1-pentene) (PMP), polyvinylchloride (PVC), glycol-modified polyethylene terephthalate (PETG), polystyrene (PS), acrylonitrile-butadiene-styrene co-polymer (ABS), polyphenylene ether (PPE), polycarbonate (PC), polysulfone (PSU), polyethersulfone (PES), polyetherimide (PEI), polyphenylsulfone (PPSU), polyethylene terephthalate (PET), and polybuylene terephthalate (PBT). In a specific embodiment, the polymer is poly(4-methyl-1-pentene) (PMP) as shown below in Structure I,

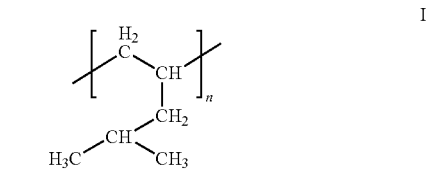

wherein n is between about 10,000 and about 5,000,000. FIGS. 1-6 all illustrate various properties of a specific embodiment of transparent nanocomposites prepared from single-wall CNTs dispersed in PMP.

Advantageously, PMP, a linear hydrocarbon, exhibits superior strength, thermal, and optical properties when compared to polyethylene (PE), a polymer commonly used in current space applications. The isotactic form of the PMP polymer is highly crystalline, yet is optically transparent as a result of having a crystalline phase with a lower density (0.828 g/cm$^3$) than the amorphous phase (0.838 g/cm$^3$) (Lopez et al. 1992). Specifically, PMP dissolves in a variety of solvents including cyclohexyl chloride, cyclohexane and cyclohexene. PMP has a much broader temperature use range than PE because it has a melt temperature, $T_m$, of around 235° C.-245° C. as compared to that of 136° C. for PE. Accordingly, the thermal properties of PMP extend to the temperature range for shielding materials. The tensile strength of high density PE is 21-38 MPa, while that of PMP is 23-28 MPa. The tensile modulus of high density PE is 0.41-1.24 GPa. For PMP tensile moduli are reported in the range from 0.8 to 1.2 GPa. The skilled artisan would understand that these are representative values under similar test conditions. Sample preparation, annealing, and any additives will affect these properties. Advantageously, PMP is transparent in the visible region of Electromagnetic Spectrum; PE is not.

In embodiments, the polymers utilized in the subject nanocomposites can be modified by doping with organic dyes that have at least one phenyl ring. Organic dyes useful to dope the polymers can include, for example and without limitation, pterphenyl, biphenyl, and p-quaterphenyl.

The field of optoelectronics could also benefit from the incorporation of carbon nanotubes in PMP. The fabrication of a polymer-nanotube composite with enhanced electrical properties while limiting the loss of transparency would serve many applications where these properties are needed, such as electrostatic charge dissipation (ESD) (static control) in which the goal is to increase electrical conductivity while limiting the loss of transparency. ESD is beneficial in clean rooms, offices and laboratories, assembly processes, and much more.

Another aspect of the subject invention is directed to methods of preparing the polymer/CNT composites. The composites can be prepared by dissolving the polymer in a first solvent and sonicating the CNTs in a second solvent. In one embodiment, the first solvent and the second solvent are the same. Preferably, the solvent is a halogenated hydrocarbon. More preferably, the halogenated hydrocarbon is cyclohexyl chloride. Optionally, the CNTs can be pretreated with a polar solvent, for example, N,N-dimethyl formamide (DMF) or chlorobenzene. To disperse the CNTs throughout the polymer, the sonicated CNT solution can be mixed with the polymer solution and sonicated again. If the polymer falls out of solution at room temperature, it may be necessary to perform these steps with the solvent heated to and maintained at an elevated temperature. Preferably, the elevated temperature is within the range of about 70° C. to about 110° C. More preferably, the elevated temperature is within the range of about 80° C. to about 100° C. Most preferably, the elevated temperature is within the range of about 85° C. to about 95° C. In yet another embodiment, the elevated temperature is heated to and maintained at a temperature of about 90° C. The resulting polymer/CNT solution can be spin coated onto a device to apply a radiation resistant coating. In another embodiment, the resulting polymer/CNT solution can be heated and molded into a device that is used in an environment exposed to GCR radiation.

Yet another aspect of the subject invention is directed to methods of using the composites. Because of the composites' ability to resist ionizing radiation, an apparatus that is exposed to radiation when in use can be prepared from a sufficient amount of the composite to resist radiation. Preferably, the composite is found on the surface of the apparatus. In one embodiment, the subject composites can be applied as a coating on the outer surface of the apparatus. In another embodiment, the composite can be molded into an end-use equipment, for example, where it would become a structural part of the apparatus.

As noted above, the polymer can be doped with an organic dye having at least one phenyl ring. Composites prepared with doped polymers are useful in thermoluminescent detection. High energy particles and radiation excite π electrons in the phenyl rings of the organic dyes; photons are emitted when the electrons relax to the ground state. These photons can be transported to photodetectors and counted. In this way, the radiation environment of the shielding materials can be continuously monitored. Thus, the composites of the subject invention can be used to monitor ionizing radiation.

For composites containing the polymer doped with organic dyes, the organic dye can be added to the polymer solution. The polymer becomes doped during the subsequent sonification step with the sonicated CNT solution.

As used in this specification and the appended claims, the singular forms "a", "an", and "the" include plural reference unless the context clearly dictates otherwise. Thus, for example, a reference to "a composite" includes more than one such composite, a reference to "the method" can include more than one method, and the like.

The terms "comprising", "consisting of", and "consisting essentially of" are defined according to their standard meaning and may be substituted for one another throughout the instant application in order to attach the specific meaning associated with each term.

As used herein, the term "CNT" or "CNTs" refer to carbon nanotubes or a carbon nanotube.

As used herein, the term "SWNT" refers to a single-wall carbon nanotube or single-wall carbon nanotubes.

As used herein, the term "PMP" refers to the polymer poly(4-methyl-1-pentene) and is interchangeable with "P4M1P".

As used herein, the term "MWNT" refers to a multi-wall carbon nanotube or multi-wall carbon nanotubes.

Materials and Methods

Poly(4-methyl-1-pentene) and cyclohexyl chloride solvent were purchased from Sigma Aldrich (Milwaukee, Wis.). The N,N-dimethylformamide solvent was obtained from Fisher Scientific (Pittsburgh, Pa.). Purified laser ablated single-walled carbon nanotubes (SWNT) were provided by the Center for Nanotechnology/NASA Ames Corporation (Moffett Field, Calif.).

a) Differential Scanning Calorimetry (DSC): A TA Instruments 2920 DSC is used to scan 5 mg samples at a rate of 3° C./min. Glass transition temperatures and melting points are determined.

b) Dynamic Mechanical Analysis (DMA): The viscoelastic properties were collected on a TA Instruments 2980 Dynamic Mechanical Analyzer (DMA). The mode was set to measure a tension film from frequencies ranging from 1 Hz to 100 Hz with an amplitude of 5 microns. The average sample size was 14.4×5.8×1.3 mm. Because measurements are time, temperature and frequency dependent, a temperature range was taken from −150° C. to 300° C.

This defines the use temperature for the materials. An increase in moduli and glass transitions temperatures accompanies SWNT incorporation.

c) Dielectric Analysis (DEA): Disks are compression molded and scanned in a TA Instruments 2970 DEA. The real and imaginary components of the dielectric constant are determined. A standard analysis of viscoelastic properties ensues. Neat PMP and neat PE are not dielectrically active. Composites are tested via DEA.

d) UV Visible Spectroscopy and Transparency: Samples are compression molded in 1 cm diameter disk molds with a thickness of 0.5 cm. Ferrotyping plates will be used on each side of the mold to ensure optical surfaces. Transmission spectra are recorded with an 8452A Hewlett-Packard UV/Visible Spectrophotometer. Neat PMP and low concentration SWNT composites are studied. PE is opaque.

e) Refractive Index: An Abbè Refractometer equipped with a solid sample assembly will be used to determine the refractive indexes of any transparent samples. The incorporation of nanotubes should increase the refractive index of the systems due to incorporation of aromatic moieties.

f) Conductivity: Thin films of the polymer/nanotube composite are spun coat using a Chemat Tech Spin Coater, KW-4A. A four point probe is used to measure the conductivity of the thin films.

g) Tensile Modulus and Tensile Strength: Dog-bone shaped samples are compression molded. A Q-Test Universal Tester is used to determine the modulus and strength of the samples. Samples are deformed at a cross head speed of 0.5 inch/min.

h) Microhardness: A Leica VMHT MOT with a Vickers indenter is used to determine the Vickers hardness number (HV). Four indentations are made on each sample using a load of 500 g and a dwell time of 20 s. The Vickers hardness number is based on the average diagonal length of an imprint made from the indentor. Both the horizontal and vertical diagonal lengths are measured for each indentation. The values reported are an average of these eight measurements.

i) Fourier Transform Infrared Spectroscopy (FTIR): A Nicolet Magna 500 FTIR is used to characterize the PMP synthesized in-house and by Phillips. The symmetric stretching in carbon nanotubes does not give rise to IR absorption bands.

j) Nuclear Magnetic Resonance is used to monitor PMP purity and stereoregularity via a Bruker DPX 250 instrument.

k) Scanning Electron Microscopy (SEM): A Hitachi S-800 Field Emission HRSEM is used to characterize the molded surfaces and fracture surfaces of the nanotube/polymer composites in order to monitor dispersion.

l) Transmission Electron Microscopy (TEM): Phillips FEI Transmission Electron Microscope is used to characterize dispersion of the nanotubes at higher magnifications than those obtained with SEM.

EXAMPLE 1

Single-Walled Carbon Nanotube Preparation

Raw laser ablation material provided by NASA Johnson Space Center was purified as described elsewhere (Liu, J. et al. (1998) "Fullerene Pipes", Science. 280(5367):1253-1256.). The raw nanotubes were refluxed in 2.6 M nitric acid for approximately 160 hours and then diluted with double distilled water. This solution was then centrifuged (4000 rpm), the solvent mixture decanted, and the sample was again suspended in double distilled water. This step was repeated two more times in order to remove the acid from the nanotubes. Finally, the solution was filtered through a cellulose nitrate filter and died at 60° C. in a vacuum oven to form a buckypaper.

Polymer/Nanotube Composite Synthesis

Commercial low molecular weight poly(4-methyl-1-pentene) with a measured $T_m$ of 235° C. was dissolved in cyclohexyl chloride at 110° C. to make a 3.5% solution. Laser ablated SWNTs were sonicated in N,N-dimethylformamide (DMF) using a Branson Sonifer 450 for 1 hour. The nanotube/DMF dispersion was placed in a vacuum oven at 80° C. to remove the solvent. The DMF treated nanotube paper was then dispersed in cyclohexyl chloride via sonication for 6 hours. The nanotube/solvent mixture was added to the polymer solution and sonicated together for 1 hour. The polymer/nanotube/cyclohexyl chloride mixture was placed in a warm beaker lined with TEFLON film, the solvent was allowed to evaporate at room temperature for 12 hours, and the composite was then placed in a vacuum oven at 80° C. to remove any residual solvent. The dried composite with 0.5% (by wt) of SWNTs was compression molded for analysis. Pieces were placed between KAPTON film and stainless steel plates and pressed for 5 minutes at 5000 pounds of pressure at a temperature of 246° C. Neat PMP was prepared in the same manner. After processing, the measured $T_m$ for the neat and composite sample was 235° C.

Sample Characterization

Ultraviolet-visible spectra were recorded with an Agilent Technologies 8453 UV-VIS Diode Array spectrophotometer. A glass slide served as the blank. FIG. 1 shows the UV-VIS data of the neat PMP and PMP/CNT composite.

Figure 3:
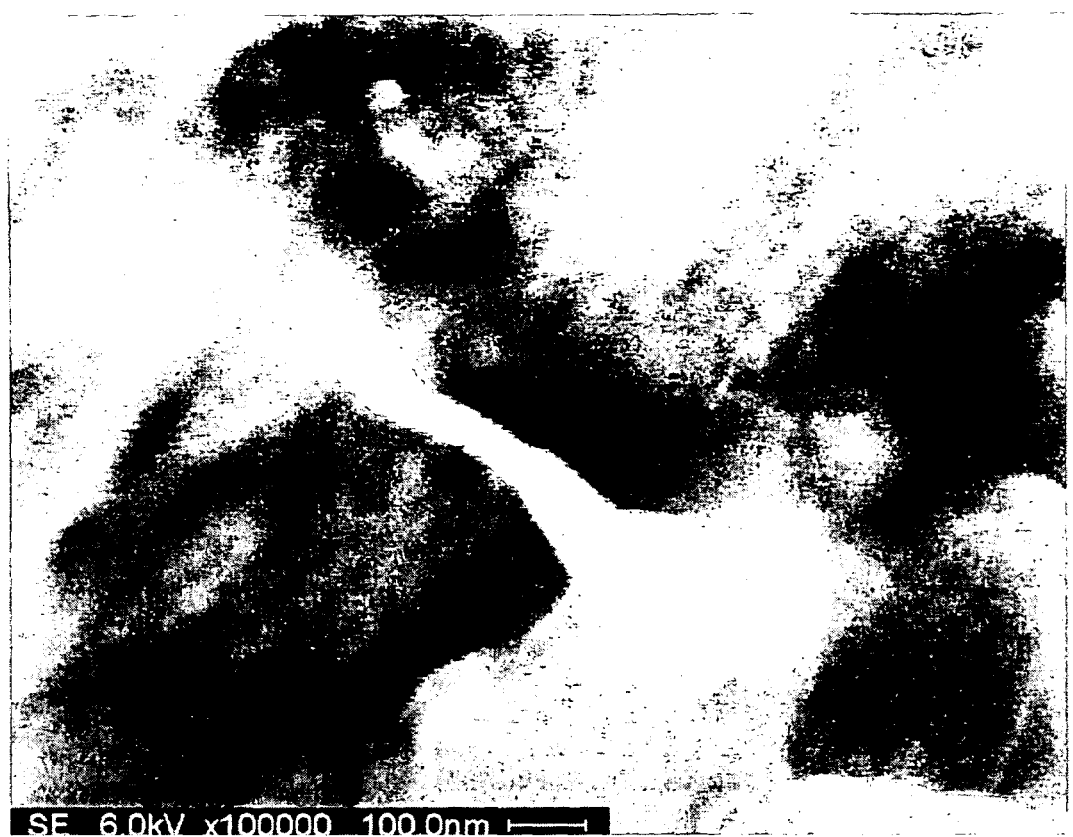
FIG. 3 illustrates a scanning electron microscope (SEM) image of a transparent PMP/CNT composite.
Figure 4:
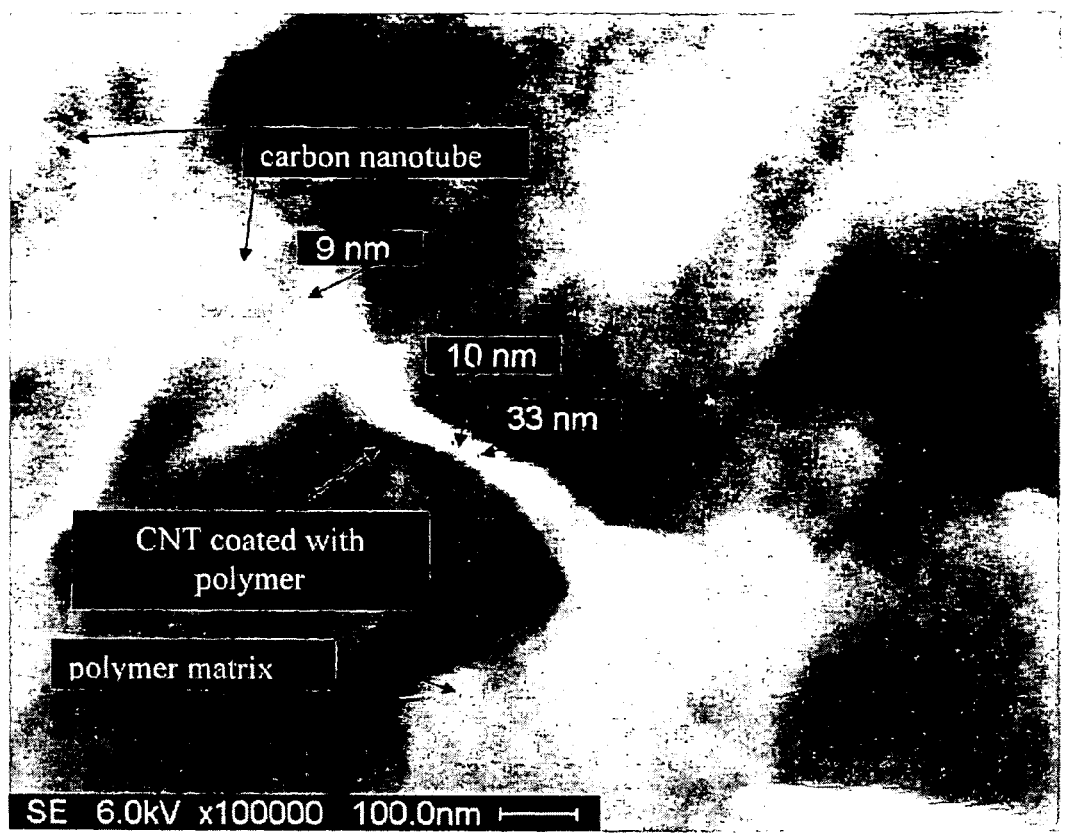
FIG. 4 illustrates a scanning electron microscope (SEM) image of a transparent PMP/CNT composite.
Figure 5:
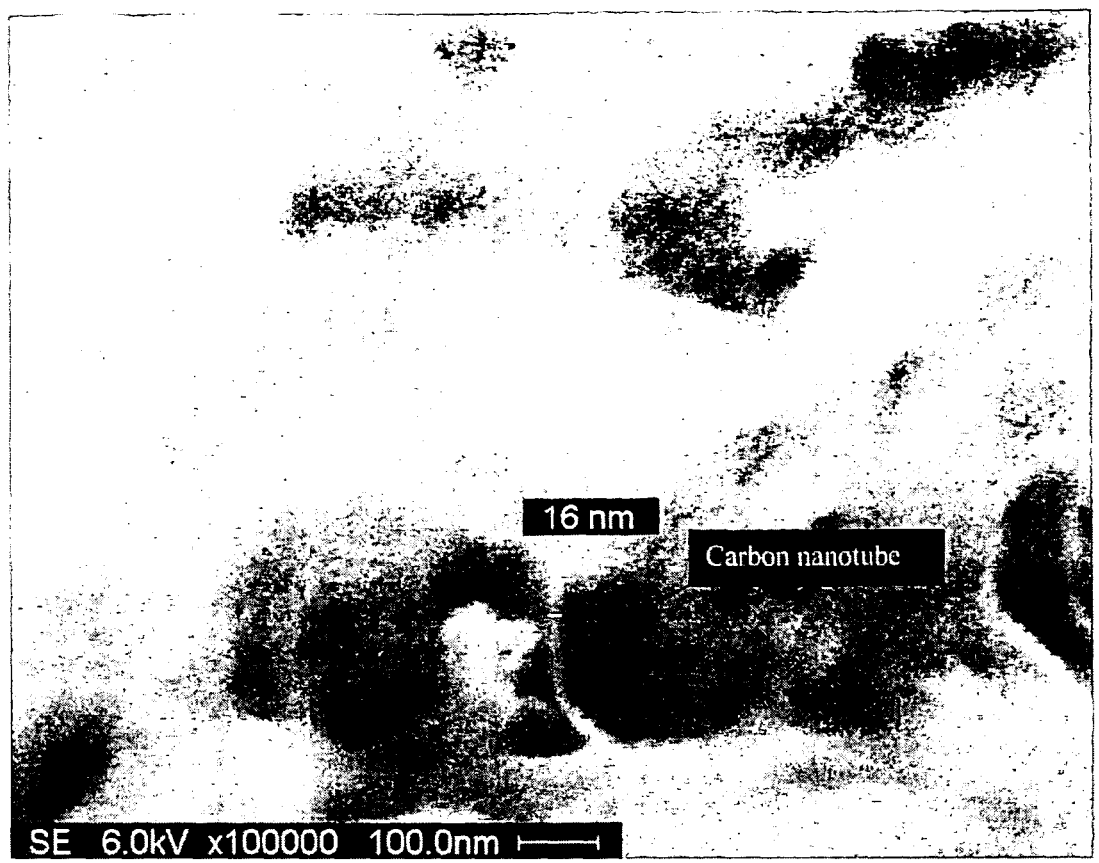
FIG. 5 illustrates another SEM image showing that although the films are transparent and nanotube agglomerates are not visible to the naked eye, nanotubes are present within the matrix.
Figure 6:
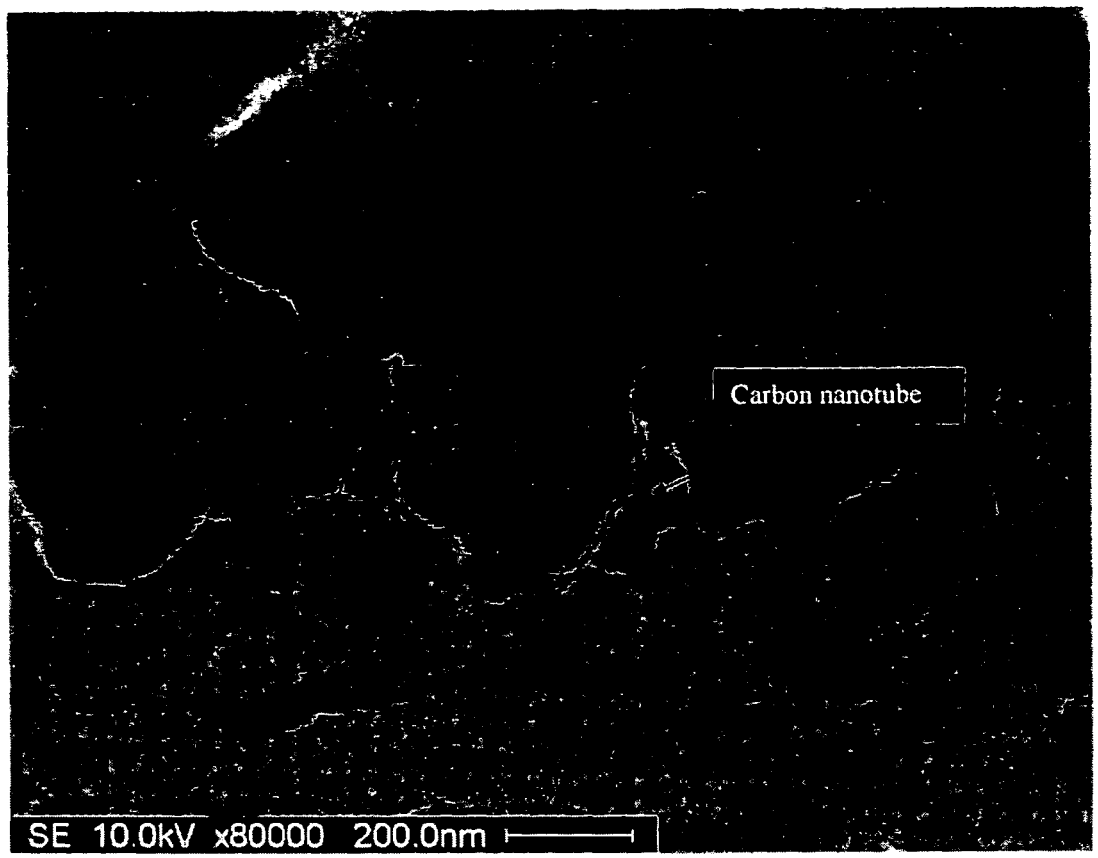
FIG. 6 illustrates yet another SEM image showing that although the films are transparent and nanotube agglomerates are not visible to the naked eye, nanotubes are present within the matrix.

FIGS. 3 and 4 are scanning electron microscope images of the PMP/CNT composite. The image evidences the presence of a carbon nanotube coated by the polymer matrix. FIGS. 5 and 6 are more SEM images. SEM images prove that although the films are transparent and nanotube agglomerates are not visible to the naked eye, nanotubes are present within the matrix.

Carbon nanotubes in the powder form may be used instead of buckypaper. This will allow for better yield and dispersion. Nanotube concentrations ranging from about 0.10 wt % to about 20 wt % are also within the scope of this invention.

Figures 7A, 7B, 7C:
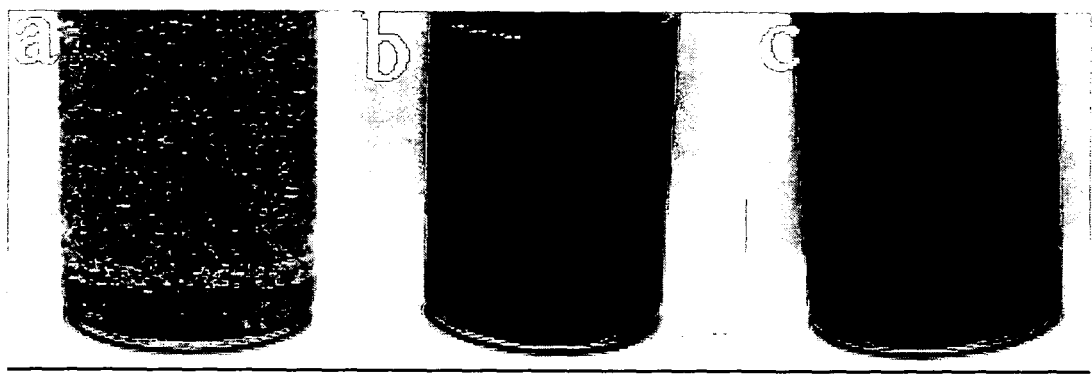
FIG. 7(a) illustrates carbon nanotubes sonicated in 1-chlorohexane. The carbon nanotubes were pretreated with DMF. The 1-chlorohexane did not dissolve PMP, nor did it effectively disperse the pretreated carbon nanotubes.
FIG. 7(b) illustrates carbon nanotubes sonicated in cyclohexyl chloride. The carbon nanotubes were pretreated with DMF.
FIG. 7(c) illustrates a uniformed mixture of cyclohexyl chloride, PMP, and carbon nanotube.
Figures 8A, 8B:
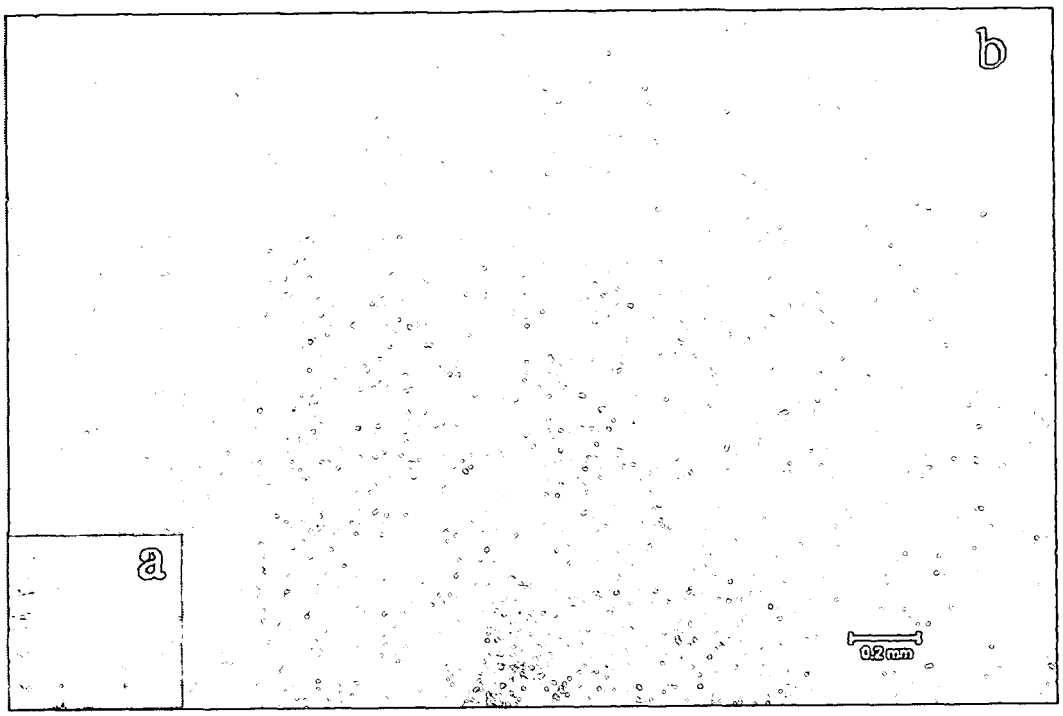
FIG. 8(a) illustrates an optical micrograph of neat PMP. The magnification is 10×0.3.
FIG. 8(b) illustrates an optical micrograph of a 0.5% PMP/single wall carbon nanotube composite. The magnification is 10×0.3.

1-chlorohexane did not dissolve the polymer nor was it efficient at dispersing the nanotubes (FIG. 7(a)). Cyclohexyl chloride was found to create a uniformed solvent/nanotube mixture (FIG. 7(b)) as well as a uniformed solvent/polymer/nanotube mixture (FIG. 7(c)). FIG. 8(b) is an optical micrograph of the PMP thin film. FIG. 8(a) is an optical micrograph of neat PMP for comparison with FIG. 8(b).

Dynamic Mechanical Analysis

PMP has three reported mechanical relaxations: the $\alpha_a$ also referred to as $\beta(\alpha_a)$ ranging from 20° C.-67° C. (Woodward et al. 1961; Miyoshi et al. 2004; Reddy et al. 1997), a broad high temperature relaxation ($\alpha_c$) ranging from 105° C.-135° C. (Lopez et al. 1992; Reddy et al. 1997; Choy et al. 1981; Miyoshi et al. 2004) and a low temperature peak ($\gamma$ or $\beta_{sc}$) was also observed at −123° C. (Woodard et al. 1961) and −140° C. (Choy et al. 1981). The low temperature relaxation ($\gamma$) was not seen in the frequency range used for this study. It is defined as the rotation of the side groups and depends on the amount of amorphous character present (Lopez et al. 1986). The $\alpha_a$ transition is the glass transition region associated with the segmental motion of the polymer main chain (Penn 1966; Choy et al. 1981). The nature of the $\alpha_c$ transition is associated with motions within the crystalline phase and is believed to be an expansion of the unit cell parameter a (Lopez et al. 1992, Penn 1986, Ranby et al. 1962).

Figure 9:
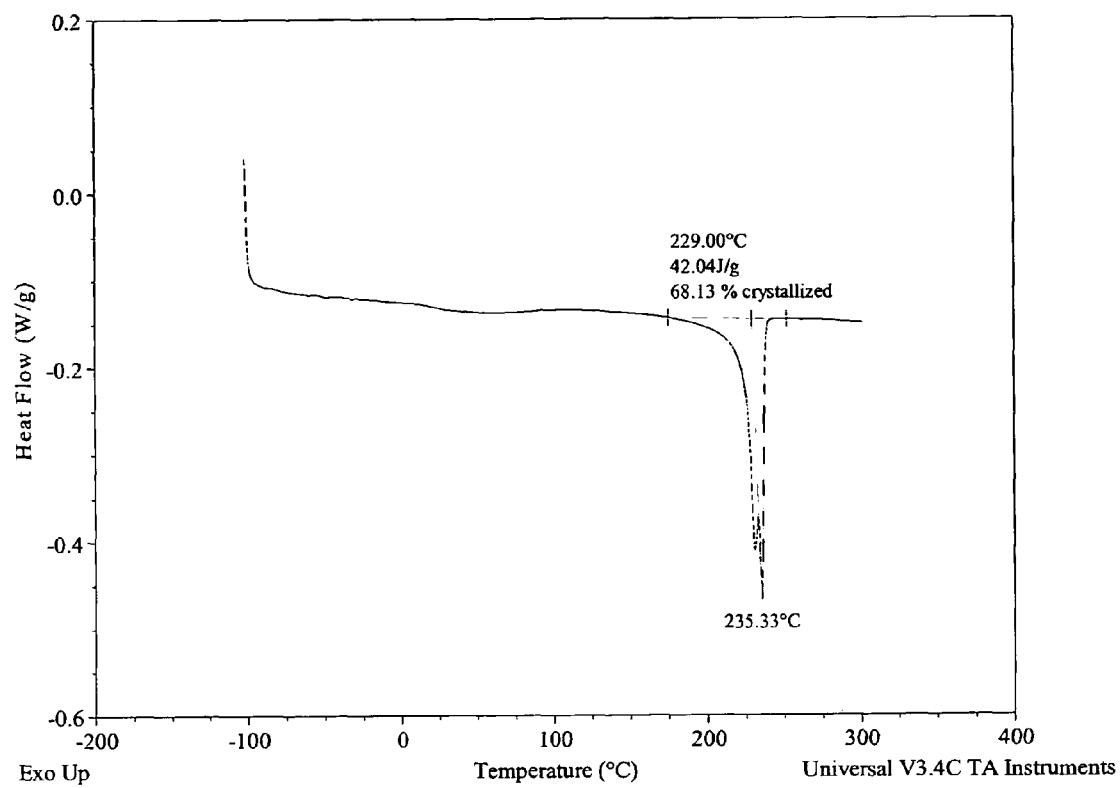
FIG. 9 illustrates a differential scanning calorimetry (DSC) plot of neat PMP.
Figure 10:
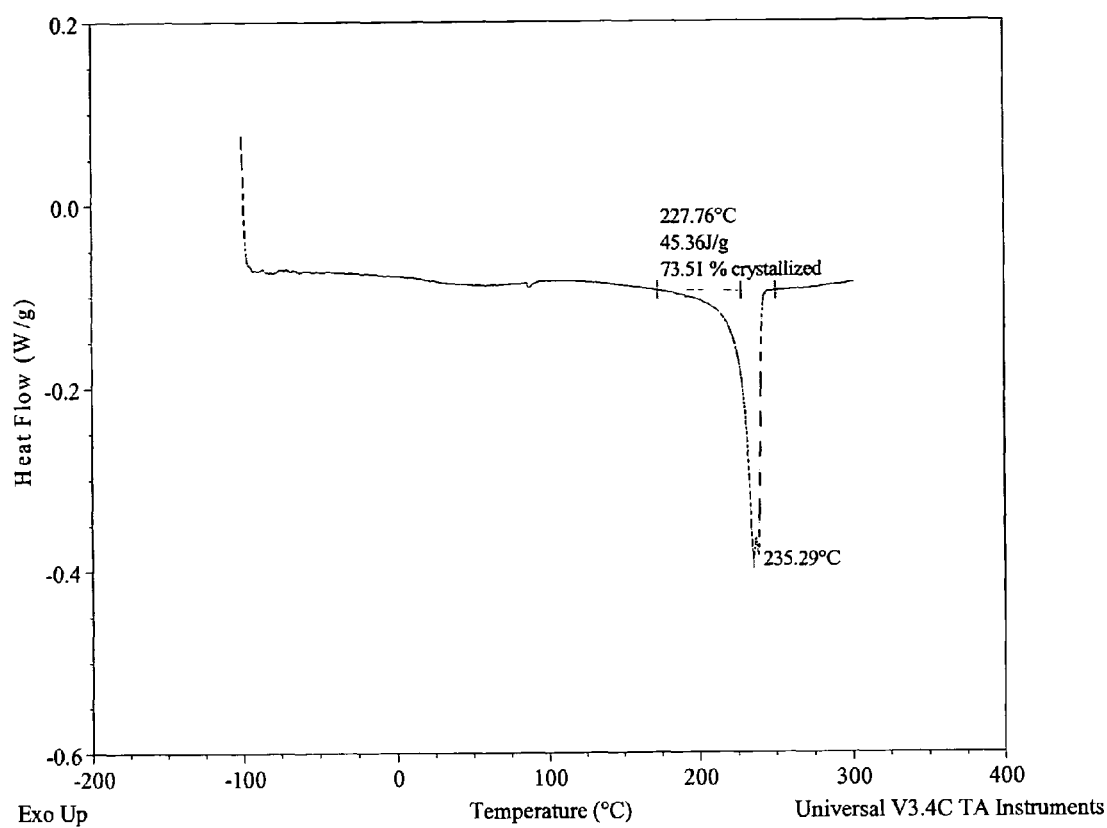
FIG. 10 illustrates a DSC plot of a PMP/SWNT composite of the subject invention.
Figure 11:
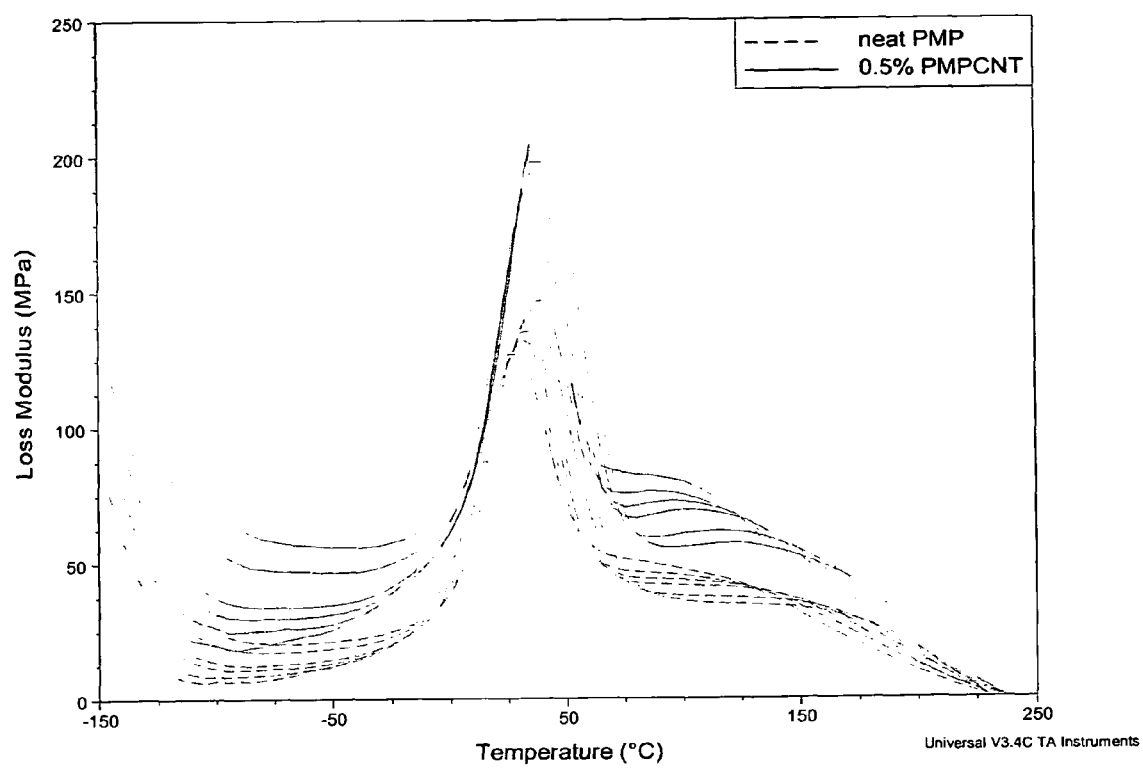
FIG. 11 illustrates Loss Modulus (E") plotted against temperature for neat PMP and PMP/SWNT.
Figure 12:
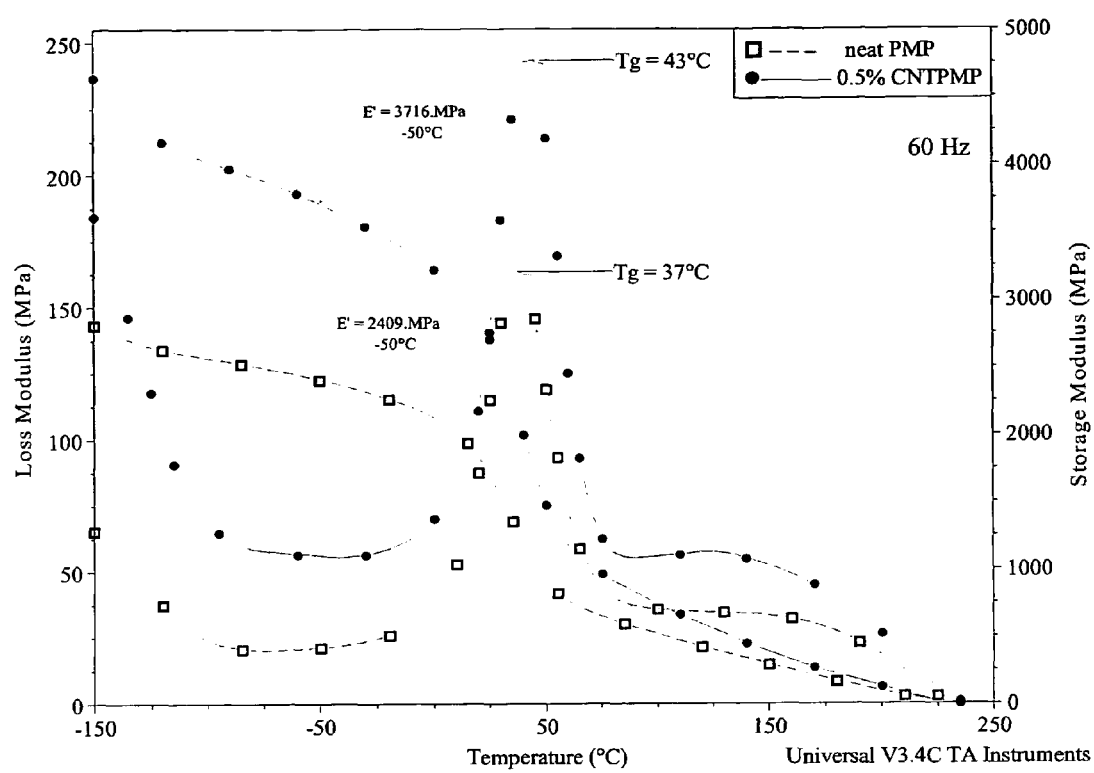
FIG. 12 illustrates dynamic mechanical analysis (DMA) data at 60 Hz of E' and E".

FIG. 11 is a plot of the loss modulus (E") plotted against temperature for the neat and composite samples from −150° C. to 250° C. and 1 Hz to 60 Hz. The loss modulus of the composite sample increases with the addition of the carbon nanotubes. The high temperature relaxation ($\alpha_c$) is more pronounced in the composite sample as compared to the neat. The percent crystallinity, as determined from DSC plots, (FIGS. 9 and 10) for the neat and composite samples was 68% and 74%, respectively. The elastic modulus (E') represents the material's stiffness. The stiffness of the composite at 60 Hz and −50° C., 25° C., and 50° C. is higher than that of the neat as indicated in Table 1, with the highest modulus existing at temperatures below the $T_g$ region (FIG. 12). Further, an increase in stiffness should correlate to an increase in the percent crystallinity of the polymer (Gedde 1999). To further support the increase in viscoelastic properties, the composite had a Vickers hardness number of 97 MPa as compared to 82 MPa for the neat.

TABLE 1

Storage Modulus (E') values at 60 Hz.

| E' (MPa) @ 60 Hz | −50° C. | 25° C. | 50° C. |
|---|---|---|---|
| Neat PMP | 2409 | 1710 | 918 |
| 0.5% PMP/CNT | 3716 | 2713 | 1494 |

The enhanced relaxation intensity of the crystalline region ($\alpha_c$) is indicative of increased interaction between the carbon nanotubes and polymer matrix. Studies have shown that carbon nanotubes can act as nucleating agents (Ryan et al. 2004; Cadek et al. 2004, Ruan et al. 2003; Bhattacharyya et al. 2003). It was shown that uniform dispersion and good interfacial bonding between CNTs and polyethylene resulted in secondary crystal growth, thus enhancing the ductility of the composite (Ruan et al. 2003). Further, a crystalline layer formed on MWNTs, contributed to the enhanced mechanical properties of polyvinylalcohol/MWNT composites (Cadek et al. 2004).

In semi-crystalline polymers, the glass transition region is restricted by crystals and exhibit broader relaxations than in the $T_g$ region of fully amorphous polymers (Gedde 1999). Thus, glass transition temperatures are difficult to decipher in differential scanning calorimetry plots. However, DMA is a useful tool in determining these values. Moreover, being that relaxations are time, temperature and frequency dependent, $T_g$ values reported from DMA must specify the frequency in which the temperature is reported. The glass transition temperatures for the neat and composite samples taken at 60 Hz were found to be 37° C. and 43° C.

Figure 13:
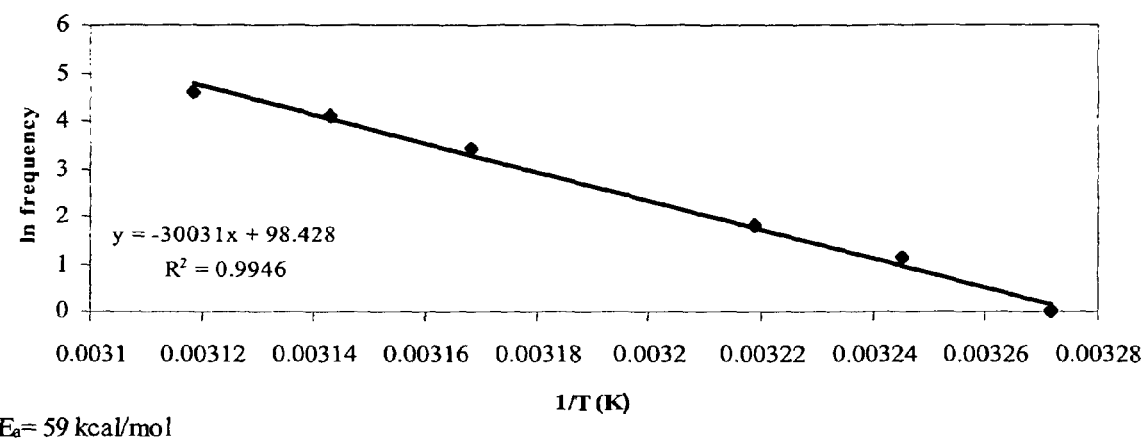
FIG. 13 illustrates an Arrhenius plot for neat PMP from 1 Hz to 100 Hz.
Figure 14:
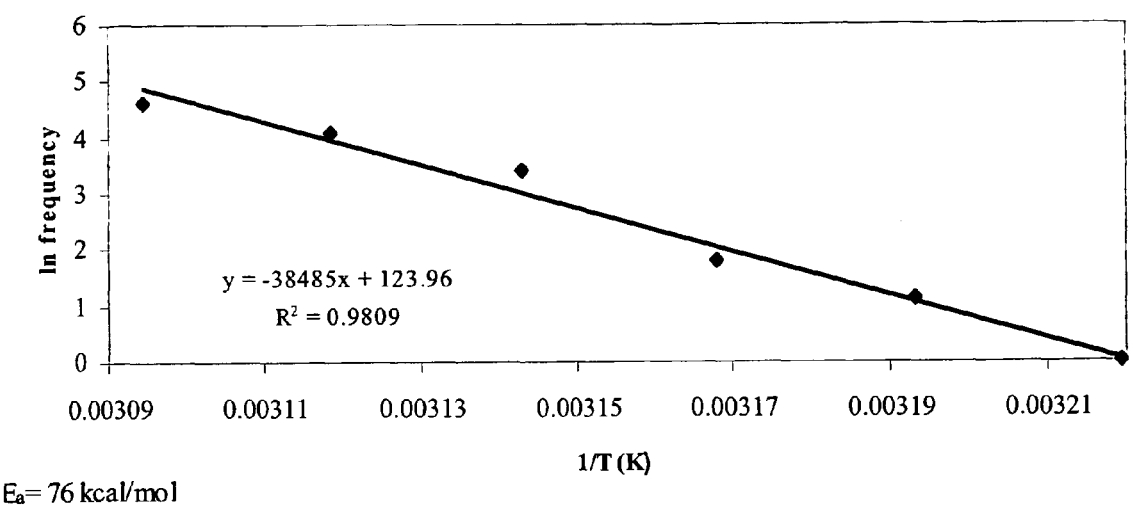
FIG. 14 illustrates an Arrhenius plot for 0.5% PMP/SWNT from 1 Hz to 100 Hz.

The maximum loss peak height obtained from DMA will shift to higher temperatures. In a narrow temperature range, the shift or frequency is linear (Gedde 1999). Temperature dependency of semi-crystalline polymers conforms to Arrhenius behavior (McCrum 1997). FIGS. 13 and 14 are Arrhenius plots of neat PMP and a specific embodiment for the subject composite. Activation energies were obtained by multiplying the slope of the line by the gas constant (1.987 cal/mol K). The neat had an activation energy of 59 kcal/mol with that of the composite being 76 kcal/mol. The energy needed to induce flow in the composite was higher. The reason for this increase is two-fold: (1) the presence of the nanotubes hindering chain movement and (2) the presence of a crystal layer on the CNTs, thus increasing the crystallinity in this region which in turn restricts the mobility of the amorphous region. Activation energies associated with viscous flow are large due to the cooperative behavior present in this region (Starkweather 1981). Lee and Hiltz (1984) obtained an activation energy of 106 kcal/mol, and Choy et al. (1981) reported 60 kcal/mol. Activation energies vary depending on the method used for testing, thus they are only approximations.

The Williams, Landel and Ferry equation (1) accounts for curvature present in the Arrhenius plot (Gedde 1999; Starkweather 1981). In this study, the values for $C_1$, $C_2$, and the reference temperature $T_o$ ($T_g$) were obtained from a curve fitting program (Gao 1996); $a_T$ represents the shift factor or frequency and T is the given temperature. Table 2 lists the values reported by Penn (1966) and Lee and Hiltz (1984). Deviations from the universal constants are typical due to variations in the glass transition temperatures and the methods used to obtain these values (McCrum 1997).

$$\log a_T = -\frac{C_1(T - T_o)}{C_2 + (T - T_o)} \quad \text{(EQ 1)}$$

TABLE 2

WLF shift constants for poly (4-methyl-1-pentene)

| Sample | $T_0$ | $C_1$ | $C_2$ |
|---|---|---|---|
| Universal constants | — | 17.4 | 51.6 |
| Neat PMP | 32.6 | 9.90 | 56.3 |
| 0.5% PMP/CNT | 37.7 | 10.2 | 48.1 |
| Lee and Hiltz | — | 20.7 | 37.0 |
| Penn | 25.0 | 17.3 | 40.4 |

Figure 15:
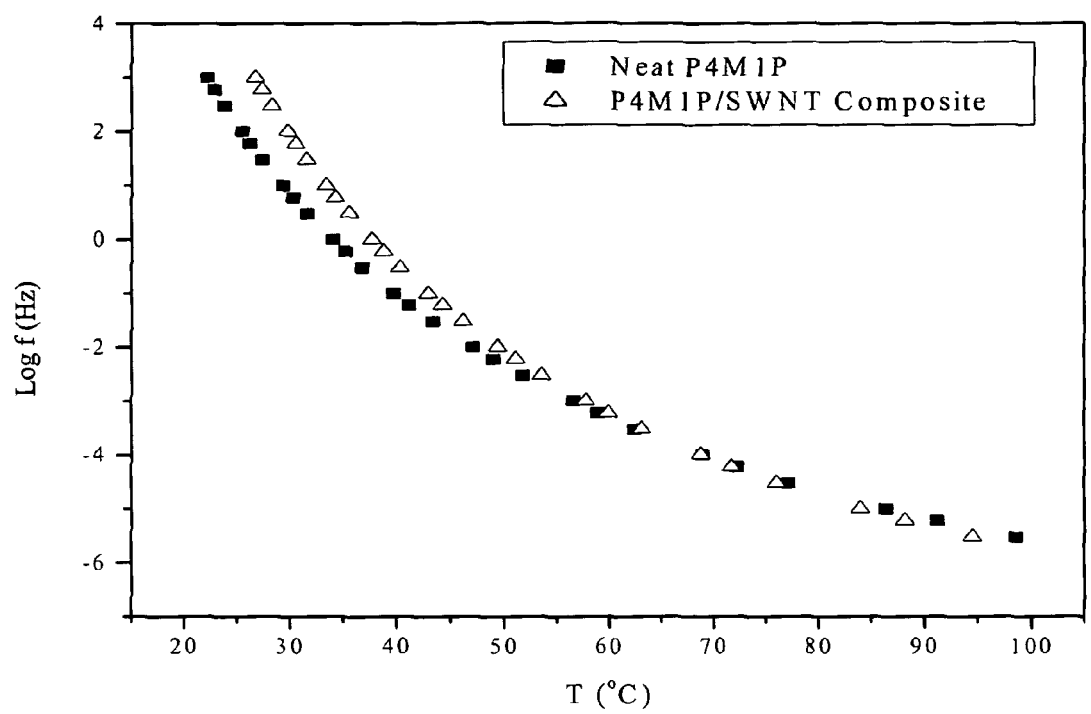
FIG. 15 illustrates a master curve of neat PMP and PMP/SWNT composite from $3 \times 10^{-6}$ Hz to 1000 Hz.
Figure 16:
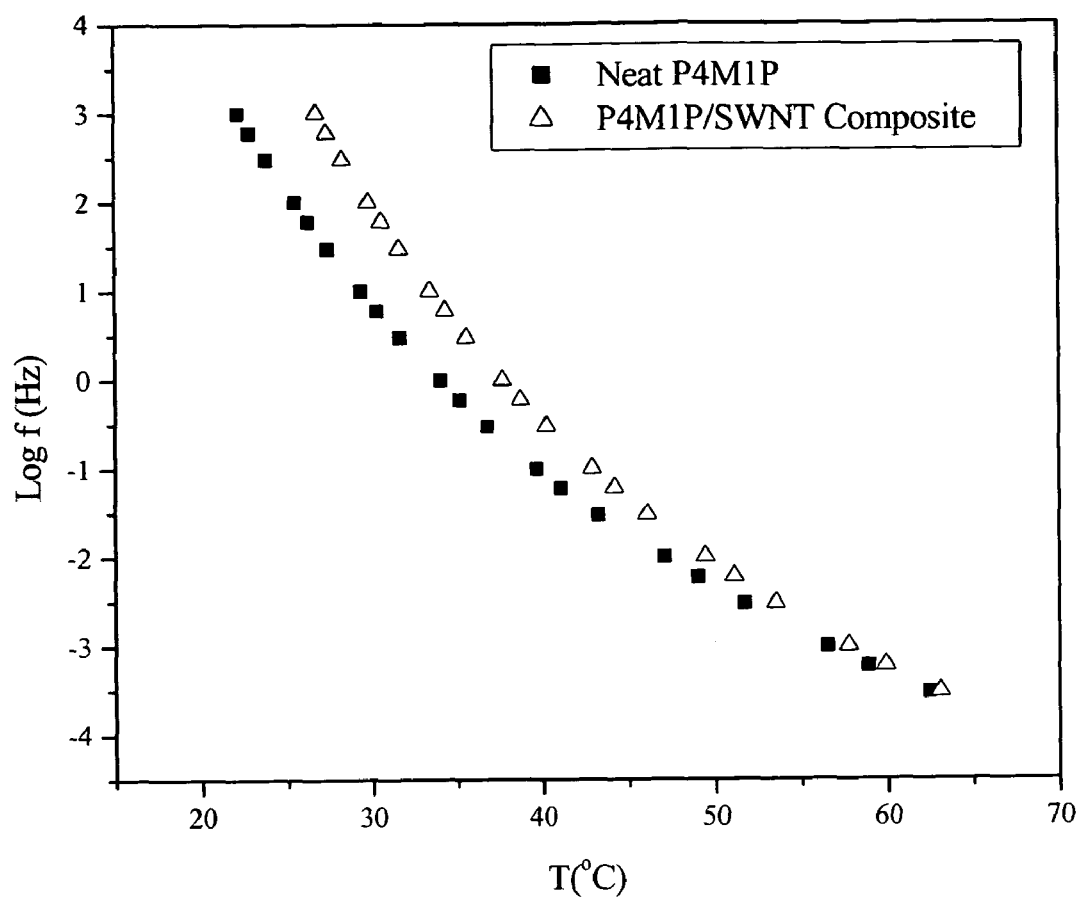
FIG. 16 illustrates master curve of reported glass transition temperature ($T_g$) region for PMP using WLF shift constants.

The WLF shift constants, $C_1$ and $C_2$, can be used to predict mechanical behavior of a polymer over a wide range of frequencies. In this study, 1 Hz, 3 Hz, 6 Hz, 10 Hz, 30 Hz, 60 Hz, and 100 Hz were used to obtain mechanical data. To further understand the behavior of PMP as a function of time and temperature over a wide range of frequencies a master curve was generated utilizing the WLF shift constants. FIG. 15 is a plot of master curves for the neat and composite samples. It is clear that over a wide range of frequencies and temperatures, PMP conforms to WLF. FIG. 16 is a plot of the glass transition region of PMP using the WLF shift constants. These results are comparable to WLF treatment of PMP previously published (Penn 1966; Lee and Hiltz 1984).

The WLF constants can also be used to calculate the fractional free volume ($f_g$) and the thermal expansion coefficient ($\alpha_f$) (Table 3) of a polymer (Aklonis et al. 1972; Emran 2000). Equations 2 and 3 were used to calculate $f_g$ and $\alpha f$, where B is equal to 1.

$$f_g = \frac{B}{(2.303)C_1} \quad \text{(EQ 2)}$$

$$\alpha_f = \frac{f_g}{C_2} \quad \text{(EQ 3)}$$

$f_g$ defines the amount of unoccupied space between chain segments as a result of chain segment packing (Aklonis et al. 1972). Conclusions can not be made based on the calculated fractional free volume and coefficient of thermal expansion for the neat and composite sample due to the small loading of carbon nanotubes; however, it can be stated that the composite can be used in applications in which the pure polymer is desired.

TABLE 3

WLF constants and calculated fractional free volume and expansion of thermal coefficient values.

| Sample | $T_o$ | $C_1$ | $C_2$ | $f_g$ | $a_f$ |
|---|---|---|---|---|---|
| Neat PMP | 32.6 | 9.90 | 56.3 | 0.0439 | 0.779 |
| 0.5% PMP/CNT | 37.7 | 10.2 | 48.1 | 0.0430 | 0.884 |

Conclusions

Carbon nanotubes were successfully incorporated into poly(4-methyl-1-pentene). The processing technique employed was found to be effective in dispersing the nanotubes in the polymer. Further, analysis of the composite confirmed that the nanotubes did in fact serve as a good reinforcement agent for the polymer. The composite sample exhibited an increase in modulus and glass transition temperature. The crystalline region as noted in the loss modulus data was found to enhance with the addition of carbon nanotubes, indicating good interaction between the polymer-nanotube interface.

Experimental data for the composite sample was fitted to WLF parameters and found to be consistent with values obtained for neat poly (4-methyl-1-pentene) in this study and previously published results (Penn 1966; Lee and Hiltz 1984); thus, characterization techniques can be extended to polymer-nanotube composites.

EXAMPLE 2

Studies Using Commercial PMP as Neat Polymer (No Nanotubes) and in USF Processed PMP/Carbon Nanotube Composites with PE Controls PMP is purchased from Phillips; PE is purchased as recommended by NASA. Single-wall CNTs are purchased from Carbon Nanotube Technologies Inc. Neat PMP, PE and PMP composites are compression molded in a Carver hot press according to sample dimension specified by NASA. The composites are prepared by sonicating SWNT in cyclohexane at temperatures below the boiling point of the solvent. PMP is added (5% polymer to solvent by weight). Nanotube concentrations vary from 0.1 to 10% based on nanotube to polymer weight. Solutions with the lower concentrations of nanotubes are cast into films of various thickness using doctor blades. The films are dried in a vacuum over at 80° C. for 12 hours. These films are stacked and compression molded to yield samples of the appropriate thicknesses required for testing. 10% nanotube solutions are dried under vacuum for 25 hours. These are used as masterbatches and diluted with PMP in a melt mixer (e.g., Banbury mixer) to produce samples with concentrations from 0.1-5% SWNT. PE nanotube composites are prepared by melt mixing 50% SWNT with 50% PE in the Banbury. This is used as a masterbatch and diluted in the Banbury with pure PE to concentrations from 0.1-5% SWNT. This procedure is repeated with PMP for comparison. PMP has the advantage of being able to undergo the sonication process described above using cyclohexane. It is expected that use of the solvent will greatly improve dispersion.

EXAMPLE 3

Studies Using Synthesized PMP and PMP Carbon Nanotube Composites

The synthesis of neat PMP polymer is a low risk experimental plan; well tested, explicit procedures are at hand (Tait, P. J. T. et al. "Polymerization of 4-Methylpentene-1 with Magnesium-Chloride-Supported Catalysts", *Advances in Polyolefins* 309 (R. B. Seymour and T. Cheng, eds. Plenum Press) (1987)). This synthesis involves the use of $MgCl_2$-supported titanium catalyst systems. The reactions are carried out in heptane or toluene solvents. Since PMP is commercially available, the reason for undertaking in-house synthesis is to take advantage of the fact that the synthesis starts out with an ultra low viscosity system, monomer in solvent. Once the in-house synthesis of neat polymer is optimized, the synthesis is adapted to include the addition of carbon nanotubes-solvent systems, which have been sonicated prior to addition to the monomer catalyst system. However, carbon nanotubes may interfere with the catalyst system and impede the polymerization or alter the stereoregularity of the polymer. All materials are available from Aldrich. The synthesis scheme used in this research is described by Tait et al. A typical recipe is as follows:

a) Preparation of the catalyst: Dried $MgCl_2$ is treated with thionyl chloride while ball milling at $MgCl_2:SOCl_2$ mole ratios of 1.0:0.05. Ethyl benzoate, EB, is added 1 to 10 mole ration based $EB:MgCl_2$. Milling continues for 72 hours. Siloxane oil is added at 0.08 moles of silicon to 1 mole of $MgCl_2$ and the system is milled for 5 hours. Neat $TiCl_4$ is added, and the system is heated to 115° C. for 1.5 hours. The system is then filtered.

b) Polymerization: Glassware is dried at 150° C. and stored under vacuum until use. The order of addition is: solvent/catalyst slurry/alkyl aluminum (triethyl aluminum)/monomer. The polymerization proceeds for 30 hours at 10° C. Concentrations are: Ti=0.028 mmole $dm^{-3}$, Al=18 mmole $dm^{-3}$ monomer=2 mmole $dm^{-3}$, solvent=excess. Neat polymers are extracted with boiling hexane. Composites are isolated by distilling of excess solvent followed by drying them in a vacuum over at 80° C. for 12 hours. Samples are molded to appropriate dimensions using a Carver hot press.

EXAMPLE 4

Ground Testing: Brookhaven National Lab (BNL)

Dosimetry is used to characterize the uniformity of the applied GCR field and the flux of the applied radiation field (Isodose Region). The size and uniformity of the field determines the sample size. Dosimetry of the applied field and the dose behind each shielding configuration are measured to determine the shielding efficiency. Several witness dosimeters are required for each trial to ensure consistency of the applied field from trial run to trial run. Each DOE test configuration is performed in triplicate. The three factors selected include thickness (250 mils and 25 mils), composite concentration (no nanotubes vs. fully loaded) and resin composition (polyethylene vs. PMP).

This DOE test matrix provides an evaluation that validates if the test conditions are accurate based on the baseline value for shielding effectiveness established by NASA-Langley. The test matrix also examines the value of densely-packed carbon atoms for determining if the cross-sectional density of the shield has been realized. Finally, the linearity of the shielding efficiency can be inferred by the thickness study (non-linearity inferring limits in stopping power or secondary radiation effects). The results will advance the understanding of material behavior and particle physics for hydrocarbon-based polymeric shields.

It should be understood that the examples and embodiments described herein are for illustrative purposes only and that various modifications or changes in light thereof will be suggested to persons skilled in the art and are to be included within the spirit and purview of this application.

REFERENCES

Abdo A. E. et al. "Natural Fibre High-Density Polyethylene and Lead Oxide Composites for Radiation Shielding", Rad. *Phys. and Chem.*, 2003, pp. 185, Vol. 66.

Aklonis, J. J. et al. *An Introduction to Polymer Viscoelasticity*, New York, Wiley-Interscience, 1972.

Andrews, R. et al. "Nanotube Composite Carbon Fibers", *Applied Physical Letters*, 1999, pp. 1329, Vol. 75.

Bhattacharyya et al. 2003, p. 2373, Vol. 44.

Biagtan, E. et al. "Polymer Scintillators: Continuous Versus Intermittent Gamma Irradiation Effects", in Optical Polymers: Fibers and Waveguides, Eds. J. P. Harmon and G. K. Noran, ACS Symposium Series 795 (2001) 221.

Cadek, M. et al. *Nano Letters*, 2004, p. 353, Vol. 2.

Choy et al. *Polymer*, 1981, p. 534, Vol. 22.

Clayton, L. M. et al. "Processing of Transparent Polymer Nanotube Composites Via Heat, UV Radiation and Ionizing (gamma) Radiation Using Ultrasonication and Solvent Dissolution" *Materials Research Society Symposia Proceedings*, 2003, pp. 223-232, Vol. 772.

Clayton, L. M. et al. "Transparent Poly(methyl methacrylate/Single-walled Carbon Nanotube (PMMA/SWNT) Composite Films with Increased Dielectric Constants" *Advanced Functional Materials*, 2005, pp. 101-106, Vol. 15.

Clough, R. et al. "Radiation Resistance of Polymers and Composites" in Irradiation Effects on Polymers, Eds. D. Clegg and A. Collier, Elsevier Applied Science, New York, 1991, p. 79.

Cuvinotta, F. A. et al. "Space Radiation Cancer Risks and Uncertainties for Mars Missions", *Rad. Res.*, 2001, p. 682, Vol. 156.

Emran, S. K. "Viscoelastic Properties of Dendrimers, Dendrimer Blends, and Dendrimer Gels", Doctoral Dissertation, University of South Florida 2000.

Fried, J. R. Polymer Science and Technology, Prentise Hall, New York, (1995) pp. 140, 291, and 362.

Gao, H. et al. "Para-substituted Polystyrenes: Stress Relaxation, Creep, Dynamic Mechanical and Dielectric Analyses", *Thermochimica Acta*, 19996, pp. 885-102, Vol. 284.

Gedde, U. *Polymer Physics*, London: Chapman and Hall, 1999.

Gillen, K. T. et al. "Dose-rate Dependence of the Radiation-Induced Discoloration of Polystyrene", Physics and Chemistry, Eds. A. Charlesby, and J. H. Hubbetl, 1993, p. 101, Vol. 41.

Goodhead, D. T. "ESR Study of Radiation Damage in TPX Polymer (Poly-4-Methylpentene-1 I)", *J. Polym. Sci., Part A-2*, 1971, p. 999, Vol. 9.

Gould, R. Ed. Irradiation of Polymers, Advances in Chemistry, ACS Symposium Series, 1967, Vol. 66.

Haggenmueller et al. "Aligned Single-Wall Carbon Nanotubes In Composites By Melt Processing Methods", *Chemical Physics Letters*, 2000, pp. 219-225, Vol. 330, Issues 3-4.

Harmon, J. P. et al. "Ionizing Radiation Effects on Interfaces in Carbon Nanotube-Polymer Composites", *Materials Research Society Symposium Proceedings Fall*, 2002, p. 2507, Vol. 17.

Hill, D. E. et al. "Functionalization of Carbon Nanotubes with Polystyrene", *Macromolecules*, 2002, p. 9466, Vol. 35.

Jia, Z. et al. "Study on Poly(methyl methacrylate)/Carbon Nanotube Composites" *Materials Science & Engineering*, 1999, pp. 395-400, Vol. A271.

Jin, Z. et al. "Nonlinear Optical Properties of Some Polymer/Multi-walled Carbon Nanotube Composites" *Chemical Physics Letters*, Mar. 3, 2000, pp. 505-510, Vol. 3 18.

Jin et al. "Interaction Of Fullerenes And Carbon Nanotubes With Diatomic Molecules", *Synthetic Metals*, 2001, pp. 1221-1222, Vol. 121, Issues 1-3.

Kim, M. Y. et al. "Performance of Polymeric Materials and Shielding for Cosmic Radiation" in *Irridiation of Polymers Fundamentals and Technological Applications*, Eds. R. L. Clough and S. W. Shalaby, ACS Symposium Series, 620 (1996) 350.

Lai, J. Y. et al. "Preparation of Vinylpyridine Irradiation-Grafted Poly(4-Methyl-Pentene-1) Membrane for Oxygen Enrichment", *Journal of Applied Polymer Science*, 1986, pp. 5763-5775, Vol. 32, No. 7.

Lee and Hiltz 1984.

Lillehei, P. T. et al. "Imaging Carbon Nanotubes in High Performance Polymer composites via Magnetic Force Microscopy", *Nano Letters*, 2002, p. 827, Vol. 2, No. 8.

Liu, J. et al. (1998) "Fullerene Pipes", *Science.* 280(5367): 1253-1256

Lopez et al. "Synthesis, Structure, and Properties of Poly(4-Methyl-1-Pentene)", *Journal of Macromelecular Science*, 1992, pp. 301-406, Vol. C32, Nos. 3-4.

McCrum, N. G. et al. *Principles of Polymer Engineering*, $2^{nd}$ Edition, 1997, New York, Oxford University Press.

Miyoshi et al. *Macromolecules*, 2004, p. 6460, Vol. 37. Odegard, G. M. et al. "Constitutive Modeling of Nanotube-Reinforced Polymer Composites", *Comp. Sci Tech.*, 2003, Vol. 63 in press.

Ounaies et al. "Electrical Properties of Single Wall Carbon Nanotube Reinforced Polyimide Composites", *Composites Science and Technologies*, 2003, pp. 1637-1647, Vol. 63, Issue 11.

Park, C. et al. "Dispersion of Single Wall Carbon Nanotubes by In Situ Polymerization Under Sonication" *Chem. Phys. Letters*, 2002, p. 303, Vol. 364.

Park et al. "Sonochemical Syntheses and Catalytic Properties of Oxide and Carbide Nanocomposites on Carbon Nanotubes", *Chemistry Letters*, 2005, 222-224, Vol. 34, No. 2.

Penn et al. *Journal of Polymer Science: Part A-2*, p. 559, Vol. 4, 1966.

Qian, D. et al. "Load Transfer and Deformation Mechanisms in Carbon Nanotube-Polystyrene Composites", *Applied Physics Letters*, 2000, p. 2868, 76.

Ranby et al. 1962.

Reddy, S. et al. *Macromolecules*, 1997, p. 3293, Vol. 30.

Ruan et al. "Toughening High Performance Ultrahigh Molecular Weight Polyethylene Using Multiwalled Carbon Nanotubes", *Polymer*, 2003, pp. 5643-5654, Vol. 44, Issue 19.

Ryan et al. "Carbon-Nanotubes Nucleated Crystallinity in a conjugated Polymer Based Composite", *Chemical Physics Letters*, 2004, pp. 329-33, Vol. 391, Issues 4-6.

Sandler, J. et al. "Development of a Dispersion Process for Carbon Nanotubes in an Epoxy Matrix and the Resulting Electrical Properties", *Polymer*, 1999, p. 5967, Vol. 40.

Star, A. et al. "Dispersion and Solubilization of Single-Walled Carbon Nanotubes with a Hyperbranched Polymer", *Macromolecules*, 2002, p. 7516, Vol. 35.

Starkweather, H. W. *Journal of Polymer Science: Part B: Polymer Physics*, 1981, p. 637, Vol. 30.

Stephan, C. et al. "Characterization of Singlewalled Carbon Nanotubes-PMMA Composites" *Synthetic Metals,* 2000, p. 139, Vol. 108.

Shaffer et al. "Fabrication and Characterization of Carbon Nanotube/Poly(vinyl alcohol) Composites", *Materials Science and Engineering,* 1999, p. 395, Vol. 271.

Siochi et al. "Design and Characterization of Caron Nanotube Composites", *Advanced Materials and Processing Branch*, NASA, 2003, Langley Research Center, Hampton, Va.

Tait, P. J. T. et al. "Polymerization of 4-Methylpentene-1 with Magnesium-Chloride-Supported Catalysts", *Advances in Polyolefins* 309 (R. B. Seymour and T. Cheng, eds. Plenum Press) (1987).

Tang, B. Z. et al. "Preparation, Alignment, and Optical Properties of Soluble Poly(phenylacetylene)-Wrapped Carbon Nanotube", *Macromolecules,* 1999, p. 2569, Vol. 31.

Tatro et al. "Probing Multi-walled Nanotube/Poly(methyl methacrylate) Composites with Ionizing Radiation", *Polymer,* 2004, pp. 1971-1979, Vol. 45, Issue 6.

Wilson, J. W. et al. "Galactic and Solar Cosmic Ray Shielding in Deep Space", *NASA Technical Paper*, December 1997, 3682.

Woodard, A. E. et al. *Journal of Polymer Science,* 1961, L:117.

Zeitlin, C. et al. "The Fragmentation of 51-MeV/Nuclean Iron-56 in Polyethylene, II. Comparisons Between Data and a Model" *Radiation Research,* 1996, pp. 666, Vol. 145.

Zoller, P. et al. *Journal of Polymer Science: Part B: Polymer Physics,* 1986, p. 1451, Vol. 24.

What is claimed is:

1. A method for preparing polymer composites, comprising:
   (a) dissolving a polymer in a first solvent at an elevated temperature;
   (b) sonicating a plurality of carbon nanotubes in a second solvent, wherein the second solvent is different than the first solvent;
   (c) mixing the first solvent including the dissolved polymer of step (a) with the second solvent including the carbon nanotubes of step (b); and
   (d) sonicating the mixture of step (c) for a sufficient period of time to substantively disperse the carbon nanotube throughout the matrix of the polymer, whereby a sonicated polymer/carbon nanotube composite in solvent is formed.

2. The method according to claim 1, wherein the elevated temperature in step (a) is within the range of about 80° C. to about 100° C.

3. The method according to claim 1, wherein the elevated temperature in step (a) is within the range of about 85° C. to about 95° C.

4. The method according to claim 1, wherein the first solvent or the second solvent is cyclohexyl chloride.

5. The method according to claim 1, wherein the first solvent is cyclohexyl chloride.

6. The method according to claim 1, wherein the polymer is selected from the group consisting of: poly(4-methyl-1-pentene) (PMP), polyvinylchloride (PVC), glycol-modified polyethylene terephthalate (PETG), polystyrene (PS), acrylonitrile-butadiene-styrene co-polymer (ABS), polyphenylene ether (PPE), polycarbonate (PC), polysulfone (PSU), polyethersulfone (PES), polyetherimide (PEI), polyphenylsulfone (PPSU), polyethylene terephthalate (PET), and polybuylene terephthalate (PBT).

7. The method according to claim 1, further comprising:
   adding an organic dye to the first solvent including the dissolved polymer of step (a), whereby during step (d), the polymer becomes doped with the organic dye.

8. The method according to claim 7, wherein the organic dye is selected from the group consisting of: pterphenyl, biphenyl, and p-quaterphenyl.

9. The method according to claim 1, further comprising:
   adjusting a concentration of carbon nanotubes in the polymer/carbon nanotube composite by mixing heat melted polymer with the polymer/carbon nanotube composite in a mixer.

10. The method according to claim 1, wherein the polymer is poly(4-methyl-1-pentene).

11. The method according to claim 3, wherein the polymer is poly(4-methyl-1-pentene).

12. The method according to claim 5, wherein the polymer is poly(4-methyl-1-pentene).

* * * * *